United States Patent
Taylor et al.

(10) Patent No.: US 12,192,166 B2
(45) Date of Patent: Jan. 7, 2025

(54) PACKET ROUTING ENHANCEMENTS IN MICROSLICES

(71) Applicant: Celona, Inc., Campbell, CA (US)

(72) Inventors: John Taylor, Campbell, CA (US); Andrew Von Nagy, Campbell, CA (US); Vinay Anneboina, San Jose, CA (US); Srinivasan Balasubramanian, San Diego, CA (US); Stu Stout, Campbell, CA (US)

(73) Assignee: Celona, Inc., Cupertino, CA (US)

( * ) Notice: Subject to any disclaimer, the term of this patent is extended or adjusted under 35 U.S.C. 154(b) by 0 days.

(21) Appl. No.: 18/164,324

(22) Filed: Feb. 3, 2023

(65) Prior Publication Data
US 2023/0254276 A1 Aug. 10, 2023

Related U.S. Application Data

(60) Provisional application No. 63/306,857, filed on Feb. 4, 2022.

(51) Int. Cl.
| | |
|---|---|
| *H04L 12/26* | (2006.01) |
| *H04L 29/06* | (2006.01) |
| *H04L 29/12* | (2006.01) |
| *H04L 61/4511* | (2022.01) |
| *H04L 101/668* | (2022.01) |

(52) U.S. Cl.
CPC .... *H04L 61/4511* (2022.05); *H04L 2101/668* (2022.05)

(58) Field of Classification Search
CPC .......... H04L 61/4511; H04L 2101/668; H04L 12/26; H04L 29/12; H04L 29/06; G06F 17/30
USPC ......................................................... 709/245
See application file for complete search history.

(56) References Cited

U.S. PATENT DOCUMENTS

| | | | | |
|---|---|---|---|---|
| 7,849,507 | B1 * | 12/2010 | Bloch | H04L 63/168 |
| | | | | 726/22 |
| 8,145,788 | B1 * | 3/2012 | Love | H04L 61/4511 |
| | | | | 709/219 |
| 9,426,049 | B1 * | 8/2016 | Kalavade | H04L 43/0876 |
| 10,044,675 | B1 * | 8/2018 | Ettema | H04L 63/0227 |
| 10,616,179 | B1 * | 4/2020 | McCarriar | H04L 61/2514 |
| 11,178,100 | B1 * | 11/2021 | Delaney | H04L 61/2503 |
| 2004/0194106 | A1 * | 9/2004 | Ogawa | H04L 61/4511 |
| | | | | 718/100 |
| 2007/0094411 | A1 * | 4/2007 | Mullane | H04L 61/2564 |
| | | | | 709/245 |
| 2008/0098101 | A1 * | 4/2008 | Black | H04L 67/56 |
| | | | | 709/223 |

(Continued)

*Primary Examiner* — Jude Jean Gilles
(74) *Attorney, Agent, or Firm* — Jaquez Land Greenhaus & McFarland; Bruce W. Greenhaus

(57) ABSTRACT

A dynamic Packet Data Network (PDN) context without requiring Access Point Name (APN) configuration on a user equipment (UE) is disclosed. The disclosed method and apparatus eliminate the need for a manual configuration of a UE in the field when different traffic forwarding or routing paths are required. The disclosed method and apparatus also provide for the proper Internet Protocol (IP) address assignment and the management of the Quality of Service (QOS) treatments applied to specific flows based on determined characteristics of the flows.

1 Claim, 1 Drawing Sheet

(56) References Cited

U.S. PATENT DOCUMENTS

| | | | |
|---|---|---|---|
| 2015/0212902 A1* | 7/2015 | Horspool | G06F 3/067 |
| | | | 707/654 |
| 2015/0358285 A1* | 12/2015 | Ellard | H04L 63/0236 |
| | | | 726/12 |
| 2016/0277497 A1* | 9/2016 | Bannister | H04L 67/1097 |
| 2016/0380960 A1* | 12/2016 | Pandrangi | H04L 67/563 |
| | | | 709/224 |
| 2018/0006912 A1* | 1/2018 | Sokolik | G06F 16/22 |
| 2021/0021518 A1* | 1/2021 | Chand | H04L 45/021 |
| 2021/0021564 A1* | 1/2021 | Chand | H04L 63/166 |
| 2021/0021565 A1* | 1/2021 | Chand | H04L 61/2596 |
| 2021/0288937 A1* | 9/2021 | Vijayvargiya | H04L 63/101 |
| 2021/0314299 A1* | 10/2021 | Gopal | H04L 63/0236 |
| 2023/0006968 A1* | 1/2023 | Catz | H04L 63/0209 |

* cited by examiner

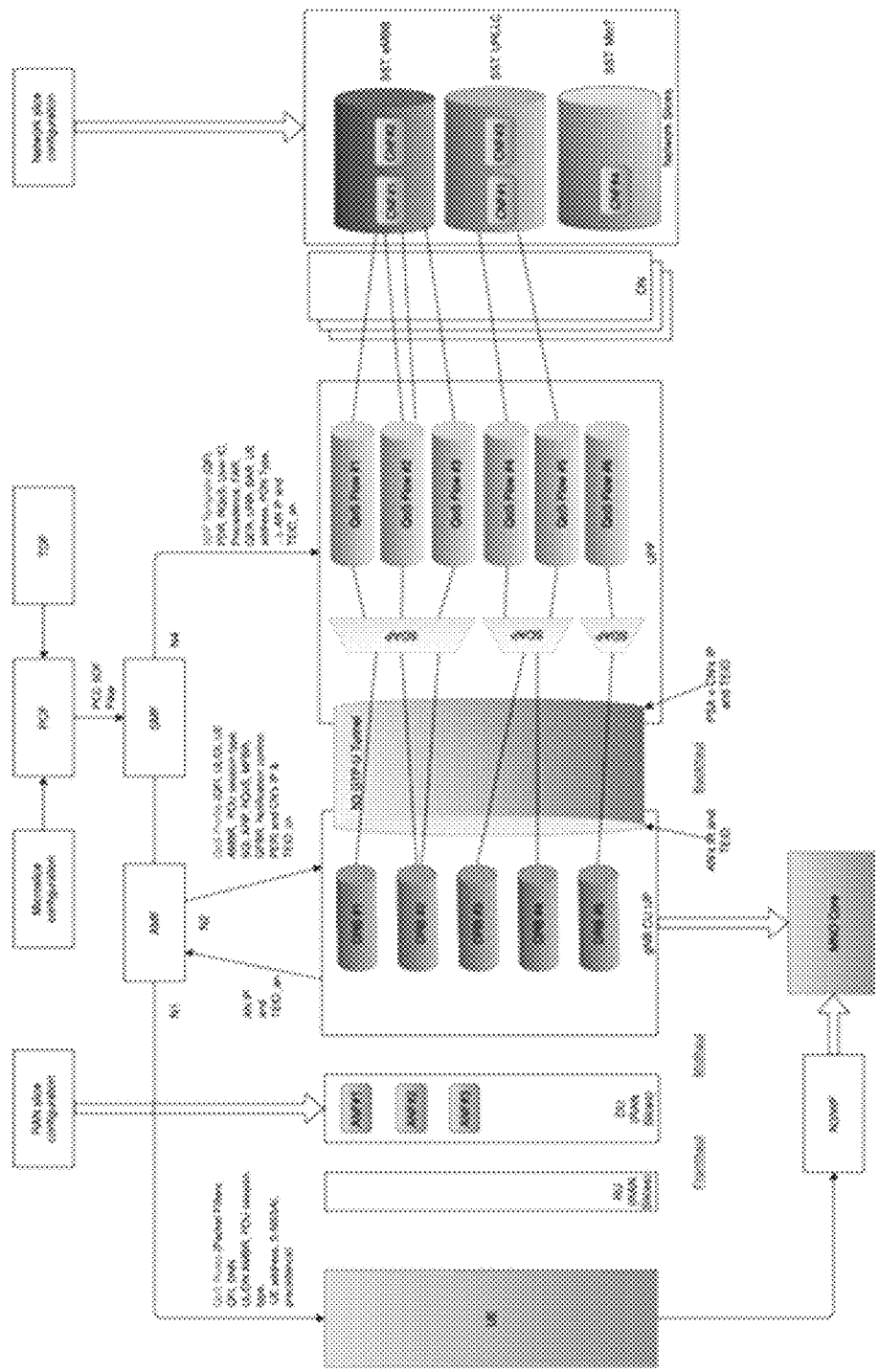

PACKET ROUTING ENHANCEMENTS IN MICROSLICES

CLAIM OF PRIORITY TO PREVIOUSLY FILED PROVISIONAL APPLICATION—INCORPORATION BY REFERENCE

This non-provisional application claims priority to an earlier-filed provisional application No. 63/306,857 filed Feb. 4, 2022, entitled "Packet Routing Enhancements in Microslices" and the provisional application No. 63/306,857 filed Feb. 4, 2022, and all its contents, are hereby incorporated by reference herein as if set forth in full.

BACKGROUND

(1) Technical Field

The disclosed method and apparatus relate generally to systems for wireless communications. In particular, the disclosed method and apparatus relates to routing communications between wireless user equipment and resources of a wireless communication network resources.

(2) Background

The management of traffic through a wireless communication network includes assigning different metrics and actions to individual packets and flows in order to provide a desired application user experience. When coupled with intelligent routing, traffic management can be used to simplify complex routing topologies in order to reduce the very large number of both dynamic and static routes between components of the communication network, such as a user equipment (UE) and a resource that is made available to the UE through the wireless communication network.

The handling of internet protocol (IP) routing, appropriate IP address assignment and QoS treatment for devices require specific considerations. Some of the devices involved are integrated UEs and end-user devices that sit behind customer premise equipment (CPEs).
Bridges In complex cellular deployments, any number of cellular bridges, hereafter referred to simply as "bridges", (e.g., CPEs) might be deployed that bridge local area network (LAN) traffic with a cellular network. LAN devices, such as Ethernet or WiFi devices, might be deployed to reside within the same physical structure as the bridge. In one example of a system, a UE, such as a robot used in a manufacturing facility or a warehouse is supported. Bridges provide LAN-side subnets and act as default gateways to connect the robot to other network components (e.g., wide area network side (WAN-side) resources) through the LAN devices attached to the bridge. On a WAN-side, a WAN-side address is assigned by a cellular network to which a connection is sought.

When a LAN device (e.g., a client, such as a UE) sends traffic not addressed to the specific LAN subnet, the bridge will route the traffic over the cellular uplink and optionally perform a source Network Address Translate (NAT) operation. When a NAT operation is not used, the network on the cellular side of the bridge must know how to route it back to the correct bridge. This is typically the case in systems in which traffic can be initiated from the uplink side. A Dynamic Host Configuration Protocol (DHCP) server on the uplink side must maintain a DHCP scope for each subnet. The DHCP scope is the range of IP addresses that are available for the DHCP server to lease out to DHCP-enabled clients on a given subnet. As the number of bridges increases, the number of subnet routes and DHCP scopes that the network must maintain corre-spondingly increases, placing a potential burden on the administrators and network devices.

Application Classification

Application Classification has become more difficult as the percentage of web-based and encrypted traffic has increased. Traditional application classification approaches inspect the transport layer addresses (ports) and/or perform deep-packet inspection (DPI) to help determine the application.

Most applications are now web-based and are hosted in the cloud. Therefore, transport addresses are less useful. These web-based applications are mostly encrypted, so a deep-packet inspection is not possible.

Accordingly, it would be advantageous to provide a mechanism to establish a desired quality of service and to simplify natively complex deployments.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 1 illustrates the SDAP function integrated with the UPF, hence unifying the packet processing of IP and ethernet flows given that the UPF does per-packet operations already.

The figures are not intended to be exhaustive or to limit the claimed invention to the pre-cise form disclosed. It should be understood that the disclosed method and apparatus can be prac-ticed with modification and alteration, and that the invention should be limited only by the claims and the equivalents thereof.

DETAILED DESCRIPTION

In accordance with some embodiments, a dynamic Packet Data Network (PDN) context without requiring Access Point Name (APN) configuration on a user equipment (UE) is disclosed. The disclosed method and apparatus eliminate the need for a manual configuration of a UE in the field when different traffic forwarding or routing paths are required. The disclosed method and apparatus also provide for the proper Internet Protocol (IP) address assignment and the management of the Quality of Service (QOS) treatments applied to specific flows based on determined characteristics of the flows.
Supernetting CPE Client Combining (i.e., "Supernetting") individual bridge subnets into a larger subnet, reduces the number of subnets to one. Accordingly, only one subnet needs to be advertised. Additionally, the number of Dynamic Host Configuration Protocol (DHCP) scopes are reduced from one per bridge, to one for all Local Area Network (LAN) devices. This significantly reduces the management burden of these complex deployments.

Traffic egressing (i.e., exiting) from the core side of cellular tunnels conforming to the well-known GPRS Tunnelling Protocol (GTP), are inspected to determine what LAN address is behind which bridge. GTP is a group of IP-based communications protocols used to carry general packet radio service (GPRS) within cellular networks.

Accordingly, all of the DHCP requests and responses that the bridges relay are parsed and an internal host route is added to allow traffic addressed to the LAN device to be routed to the correct bridge. Additionally, the default gateway/router in the DHCP responses is modified to that of the LAN side interface of the bridge, allowing one scope, which defines a single default gateway, to work for all bridges.

Furthermore, any traffic exiting a GTP tunnel on the uplink side is inspected. If the source address of any such traffic is not the bridge's cellular address, a host route is added to the internal routing table of the core to route the downlink traffic to the correct bridge. If the host route already exists, but the bridge is different, the host route is updated to point to the current bridge.

The host route remains in the internal route table of the core until the lease expires and the client has been idle for a predetermined amount of time.

Application Classification

To defeat both web-based and encrypted traffic, the application classifier in Long-Term Evolution (LTE) and fifth generation (5G) cores intercepts and inspects all Domain Name Server (DNS) traffic. This allows the core to create a mapping from DNS domain name to IP address(es). An application is defined as a list of domain names or expressions (e.g., regex) and the DNS responses are inspected for the presence of these names or expressions. When a match is found, the IP address(es) contained in the response are cached for the "time to live" (TTL) sent within the response. Accordingly, the TTL determines the amount of time the IP address will be cached. When a UE sends a request to one of the cached IP addresses, the flow is classified as belonging to the corresponding application.

Since the DNS server is assigned to each UE when it is assigned an IP address, it is easy to make sure the core can inspect all DNS packets, even when Transport Layer Security (TLS) is employed.

Application classification allow the QoS of an application to be defined. Possible QoS parameters include Guaranteed Bit Rate (GBR), Maximum Bit Rate (MBR), QoS Class Identifier (QCI), Differentiated Services Code Point (DSCP), etc.

For the LAN-side clients of the bridges as mentioned above, the DNS server in the DHCP responses is modified to be the same as that of the core, so that DNS-based application classification and QoS enforcement can be applied to the LAN device traffic as well.

Dynamic PDN Context without Requiring APN Configuration on UE

A single UE may have one or multiple applications that require different traffic forwarding characteristics based on application performance requirements or organizational security requirements. This capability allows a network operator to dynamically apply different traffic forwarding policies based on the UE and/or the application traffic flow without having to manually pre-conceive each desired policy scenario and without having to configure the UEs in the field.

In some embodiments, the UE make and model are identified based on UE capability discovery with HSS support of that device type In some embodiments, the owner of the device is identified based on external authentica-tion, authorization and accounting (AAA) database lookup (if applicable), such as RADIUS or DIAMETER.

In some embodiments, application traffic flows are identified and classified in realtime as they are established by the UE based on deep packet inspection as the initial traffic session is established. The UE will establish a connection using the default Evolved Packet System (EPS) bearer and establishes the application session. Then, based on the detection of the application type the "Edge" will dynamically move the session into a different PDN context (such as Virtual LAN (VLAN) or Virtual Extendable LAN (VxLAN)) and update the IP address allocated to the UE.

In other embodiments, the core performs a NAT operation on specific flows to ensure the packets are routed to the appropriate IP domain (VLAN/VxLAN).

Based on the traffic type and the UE's ability to support Wi-Fi, LTE, and NR, the traffic is routed over the appropriate Radio Access Technology (RAT). The UE may be simultaneously in operation over Wi-Fi and LTE or NR. Applications that are active in the UE and the IP address allocation is further guided based on IP domains that can be supported over the different RATs. In some embodiments, it is possible for the IP domain to be: (1) a 'Local Breakout' in the serving network; (2) 'Home routed' where the IP context lives in the home network and not in the visited/serving network; or (3) a 'Local Traffic Offload' where serving network uses a notch in the wire to reroute packets into the local network for specific traffic signatures when the IP domain is home routed.

SDAP Functional Node Allocation for QOS Based Packet Routing

The Service Data Adaption Protocol (SDAP) function sits in between the IP/Ethernet layer and the RAN L2 (Packet Data Convergence Protocol (PDCP)). The RAN L2 functions of PDCP, Radio Link Control (RLC), and Media Access Control (MAC) along with the Physical layer defined the QoS radio bearer otherwise termed as "dedicate radio bearer".

The SDAP layer is typically supported along with the Radio Access Network (RAN) functions. This requires a lot of packet routing functions (i.e., functions related to identifying the dedicated bearer) to also be supported in the same node as the RAN function. This can result in a computationally heavy configuration. The SDAP layer also supports functions of multiplexing one or more IP flows into a specific radio dedicated bearer. Furthermore, the SDAP layer supports reflective QoS, which requires additional packet header manipulation to provide QoS mapping for UL traffic that is short/bursty in nature and cannot afford the round-trip of signaling message to establish the dedicated bearer.

The SDAP functions are non-realtime operations and can be abstracted into a more centralized compute node to reduce the impact to the RAN nodes. This will allow for centralized policy management to be supported that will allow for a single load-balanced SDAP layer to be implemented. This also implies that the SDAP layer context can be used as the UE transitions across access points (APs) on an enterprise campus and minimizes the context transitions across the APs involved. Given that the SDAP layer performs the mapping of the IP/ethernet flows to the dedicate radio bearers, the packets are already marked appropriately to be delivered on the relevant radio bearers minimize the computation needs of the RAN node.

Such an architecture makes it identical to the LTE RAN node while providing the enhanced features of fifth generation New Radio 5G Core (5G NR/5GC). Supporting this structure improves the control for the MNO core networks to manage the QoS delivered when the UEs are connected to a neutral host network without having to share a lot of policies with the enterprise neutral host (NH) deployment.

FIG. 1 illustrates the SDAP function integrated with the User Plane Function (UPF), hence unifying the packet processing of IP and ethernet flows given that the UPF does perpacket operations already.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, ele-ments or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A wireless communication system comprising:
   a) An application classifier configured to:
      i. intercept and inspect domain name server (DNS) traffic;
      ii. combining individual bridge subnets; and
      iii. adding an internal host route to allow traffic addressed to a local area network (LAN) device to be routed to an appropriate bridge;
      iv. create a mapping from DNS domain name to Internet Protocol address based on the combined individual bridge subnets for a predetermined amount of time based on a time to live (TTL) value sent with a DNS response.

* * * * *